(12) United States Patent  
Fowler et al.

(10) Patent No.: US 8,651,351 B2  
(45) Date of Patent: Feb. 18, 2014

(54) MODULAR INTERIOR CARGO MANAGEMENT ASSEMBLY IN POLICE OR COMMERCIAL VEHICLE

(75) Inventors: James Hugh Fowler, Novi, MI (US); Gary R Fulkerson, White Lake, MI (US); Randy Michael Freiburger, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 13/072,209

(22) Filed: Mar. 25, 2011

(65) Prior Publication Data

US 2012/0048903 A1 Mar. 1, 2012

Related U.S. Application Data

(60) Provisional application No. 61/378,682, filed on Aug. 31, 2010.

(51) Int. Cl.  
*B60R 5/04* (2006.01)

(52) U.S. Cl.  
USPC ............ 224/543; 224/539; 224/281; 224/495

(58) Field of Classification Search  
USPC ......... 224/539, 498, 499, 281, 400, 402–405, 224/540–544; 296/26.09, 37.1, 37.8; 312/201, 202, 349  
See application file for complete search history.

(56) References Cited

U.S. PATENT DOCUMENTS

| | | | | |
|---|---|---|---|---|
| 2,867,471 A | * | 1/1959 | Coon, Jr. | 296/156 |
| 2,997,331 A | * | 8/1961 | Kudner | 296/24.46 |
| 2,998,279 A | * | 8/1961 | Mateny | 296/24.43 |
| 3,214,211 A | * | 10/1965 | Setina | 296/24.46 |
| 4,832,242 A | | 5/1989 | Leek | |
| 4,884,733 A | | 12/1989 | Geeves | |
| 4,964,666 A | | 10/1990 | Dillon | |
| 4,969,678 A | * | 11/1990 | Loisel | 296/24.33 |
| 5,381,940 A | | 1/1995 | Wright | |
| 5,441,183 A | | 8/1995 | Frenzel | |
| 5,511,842 A | * | 4/1996 | Dillon | 296/24.42 |
| 5,678,874 A | | 10/1997 | Choate | |
| 5,979,725 A | * | 11/1999 | Lehrman | 224/539 |
| 5,979,962 A | * | 11/1999 | Valentin et al. | 296/37.1 |
| 6,338,518 B1 | | 1/2002 | D'Annunzio et al. | |
| 6,375,055 B1 | | 4/2002 | Spykerman et al. | |
| 6,669,259 B2 | | 12/2003 | Murray et al. | |
| 6,733,060 B1 | | 5/2004 | Pavkov et al. | |
| 6,752,304 B1 | | 6/2004 | Hotary et al. | |
| 6,811,198 B2 | | 11/2004 | Caro et al. | |
| 6,814,383 B2 | * | 11/2004 | Reed et al. | 296/24.3 |
| 6,851,735 B2 | | 2/2005 | Hicks et al. | |
| 6,874,667 B2 | * | 4/2005 | Dykstra et al. | 224/498 |
| 6,983,969 B2 | | 1/2006 | Murray et al. | |
| 7,118,017 B1 | | 10/2006 | Geraghty et al. | |
| 7,195,297 B2 | | 3/2007 | Murray et al. | |
| 7,201,421 B2 | | 4/2007 | Reynolds et al. | |
| 7,401,716 B2 | | 7/2008 | Svenson et al. | |
| 7,695,042 B2 | | 4/2010 | Leroy et al. | |
| 7,748,775 B2 | | 7/2010 | Mercurio | |
| 2007/0176450 A1 | * | 8/2007 | Setina | 296/24.46 |

* cited by examiner

*Primary Examiner* — Adam Waggenspack  
(74) *Attorney, Agent, or Firm* — Vichit Chea; Price Heneveld LLP

(57) ABSTRACT

A cargo management assembly for a vehicle having a support structure having a utility wall and side supports. A cabinet assembly is operably connected with the support structure. A barrier partition is disposed above the utility wall. A floor member is disposed below the cabinet assembly and the barrier partition. The floor member includes a spare tire access panel.

20 Claims, 6 Drawing Sheets

MODULAR INTERIOR CARGO MANAGEMENT ASSEMBLY IN POLICE OR COMMERCIAL VEHICLE

CROSS-REFERENCE TO RELATED APPLICATION

This application claims priority to U.S. Provisional Patent Application No. 61/378,682, filed on Aug. 31, 2010, entitled "APPARATUS FOR MODULAR INTERIOR CARGO MANAGEMENT IN POLICE OR COMMERCIAL VEHICLE," the disclosure of which is hereby incorporated herein by reference in its entirety.

FIELD OF THE INVENTION

The present invention generally relates to a modular interior cargo management assembly in a police or commercial vehicle.

BACKGROUND OF THE PRESENT INVENTION

Traditional cabinet systems for police or commercial vehicles are full-depth cabinet systems that fill most of the space of the cargo area in a sports utility vehicle. These systems are generally bolted directly to the vehicle, and due to the bulk nature of their design, take up exceptional storage space inefficiently. These systems generally extend over spare tire wells, thus increasing the difficulty and complexity of changing a tire in an emergency situation.

SUMMARY OF THE PRESENT INVENTION

One aspect of the present invention includes a cargo management assembly for a vehicle having a support structure having a utility wall and side supports. A cabinet assembly is operably connected with the support structure. A barrier partition is disposed above the utility wall. A floor member is disposed below the cabinet assembly and the barrier partition. The floor member includes a spare tire access panel.

Another aspect of the present invention includes a cargo management assembly for a vehicle having a support structure having first and second side supports. A cabinet assembly is operably connected to the support structure. A barrier partition is operably connected to the support structure. A utility wall is disposed below the barrier partition and behind a rear seating assembly of a vehicle. A vehicle interior panel is positioned adjacent the first and second side supports and shaped to conform to at least a portion of the support structure.

Another aspect of the present invention includes a modular cargo management assembly having a support structure. A cabinet assembly is operably connected with the support structure. A utility wall is operably connected with the support structure. A barrier partition is disposed above the utility wall. A floor member is disposed below the support structure. The floor member includes a spare tire access panel.

These and other aspects, objects, and features of the present invention will be understood and appreciated by those skilled in the art upon studying the following specification, claims, and appended drawings.

DETAILED DESCRIPTION OF EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
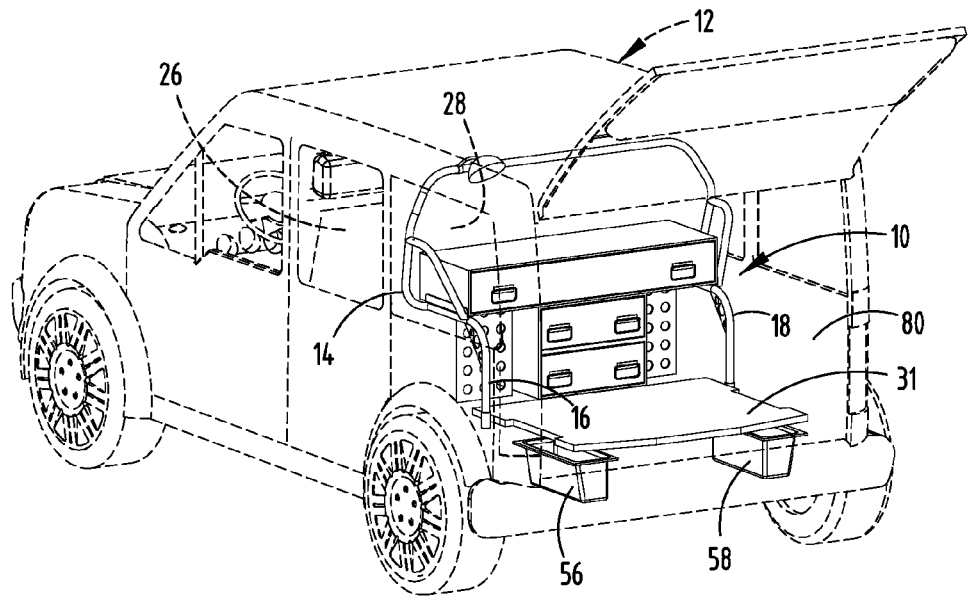
FIG. 1A is a top perspective view of a cargo management assembly of a vehicle of the present invention.
Figure 1B:
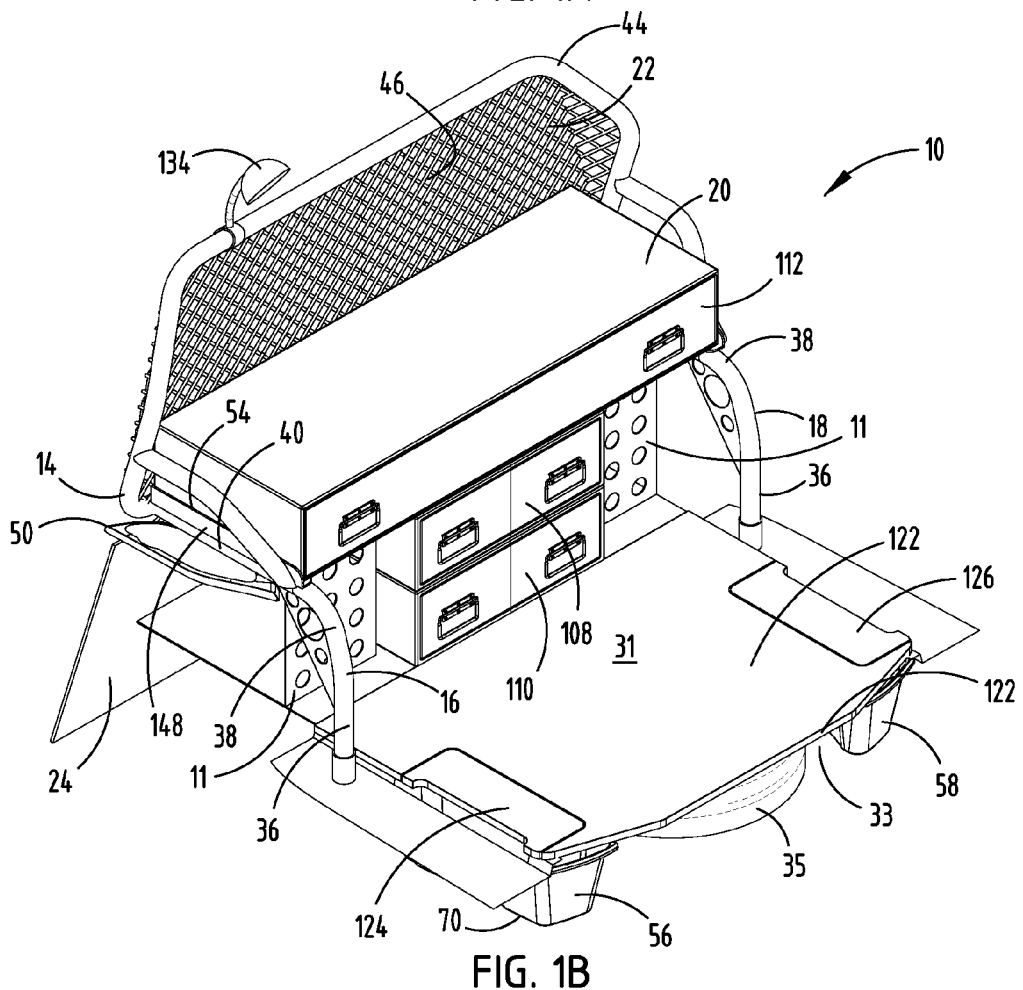
FIG. 1B is a top perspective view of the cargo management assembly of FIG. 1 with a lower storage member in an extended position.
Figure 2:
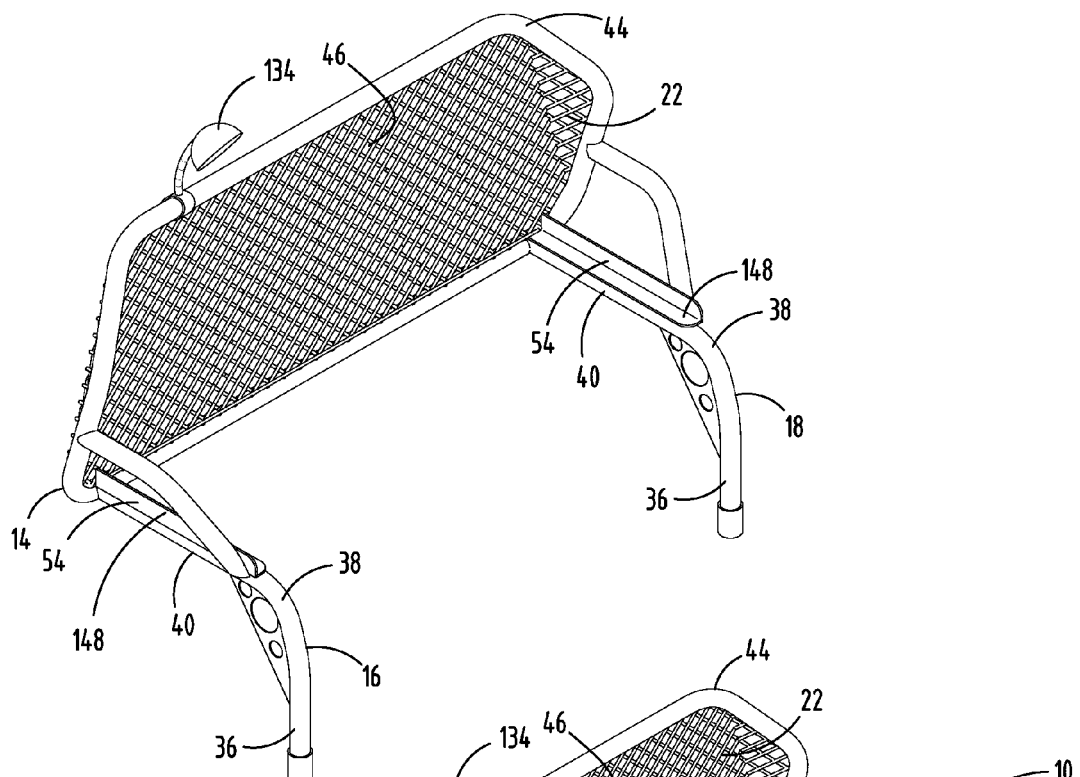
FIG. 2 is a top perspective view of a barrier partition of the cargo management assembly of FIG. 1.
Figure 3:
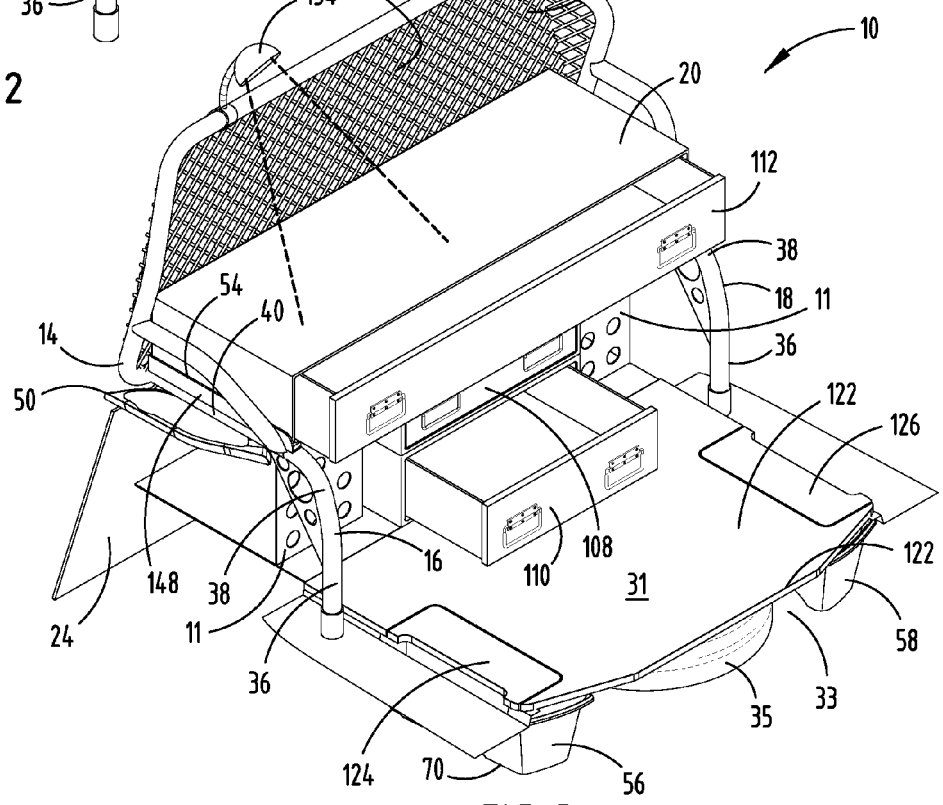
FIG. 3 is a top perspective view of the cargo management assembly of FIG. 1B.
Figure 4:
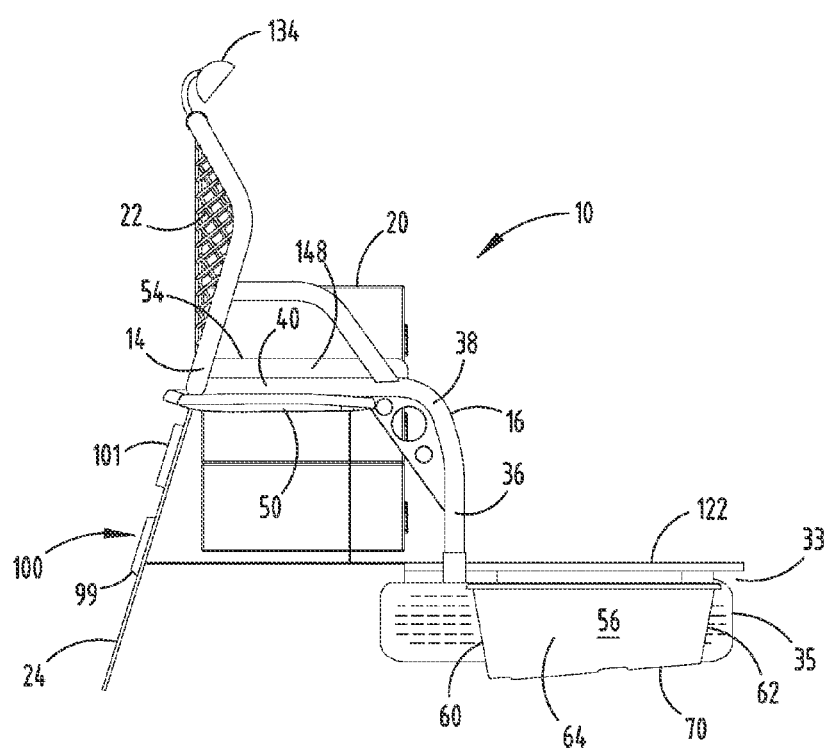
FIG. 4 is a side elevational view of the cargo management assembly of FIG. 1B.
Figure 5:
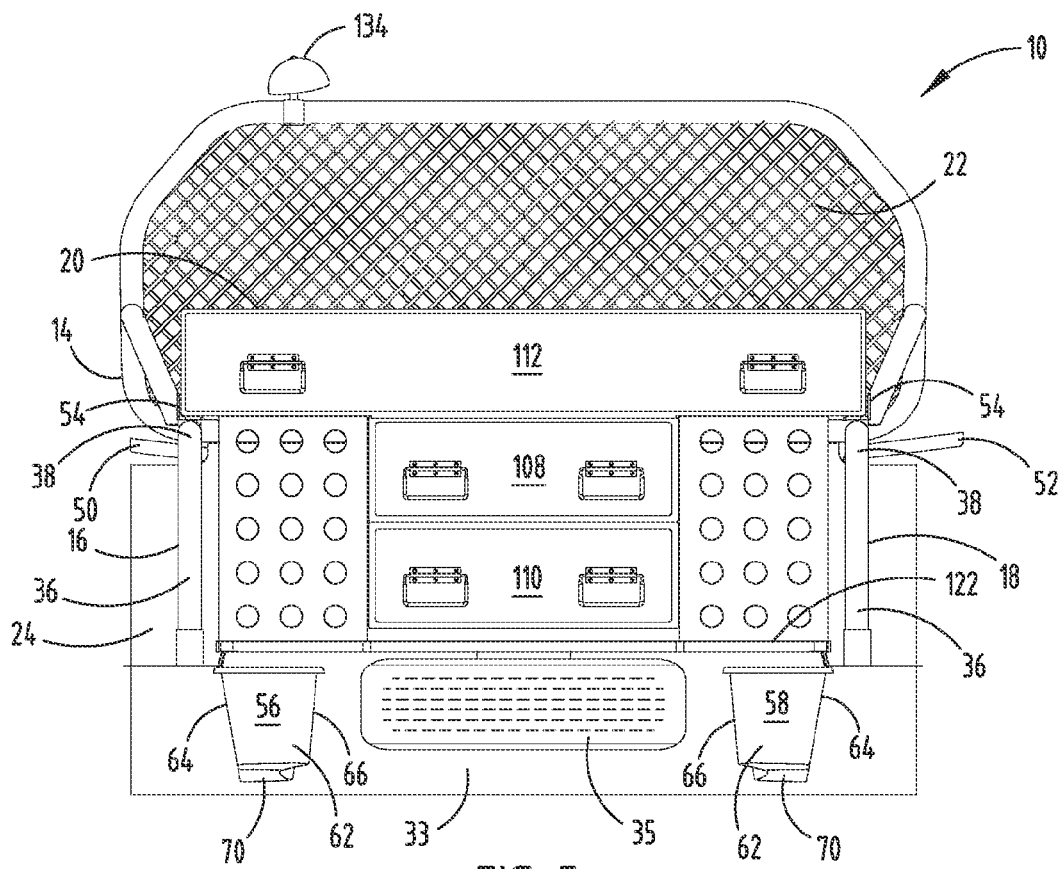
FIG. 5 is a rear elevational view of the cargo management assembly of FIG. 1B.
Figure 6:
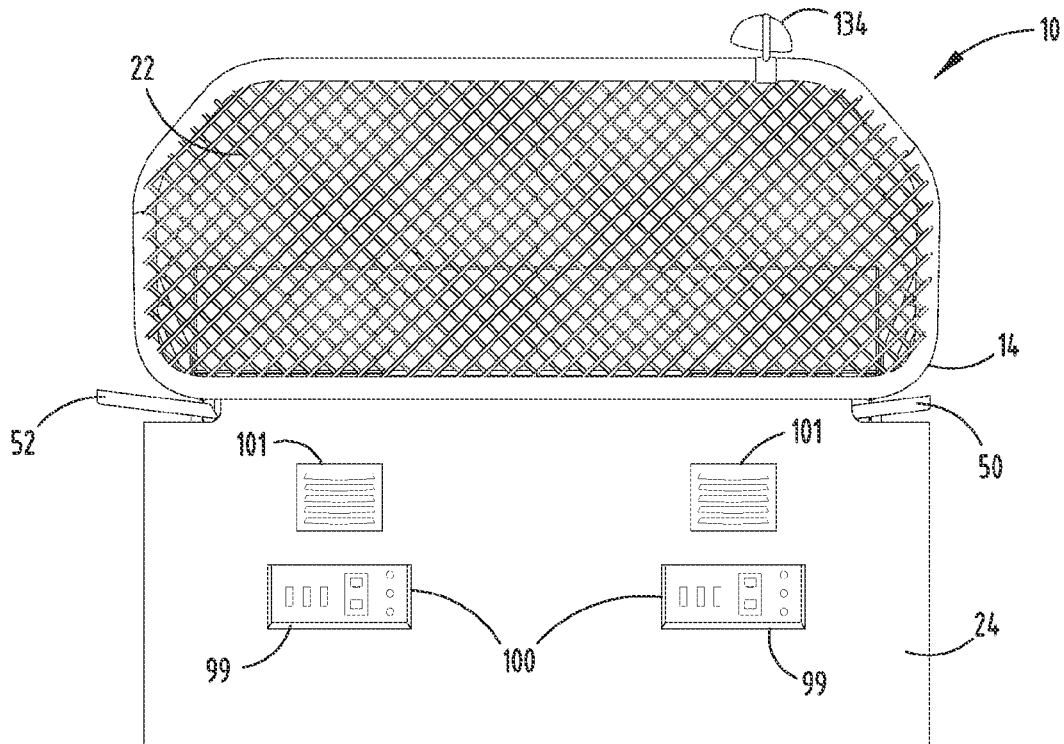
FIG. 6 is a front elevational view of the cargo management assembly of FIG. 1B.
Figure 7:
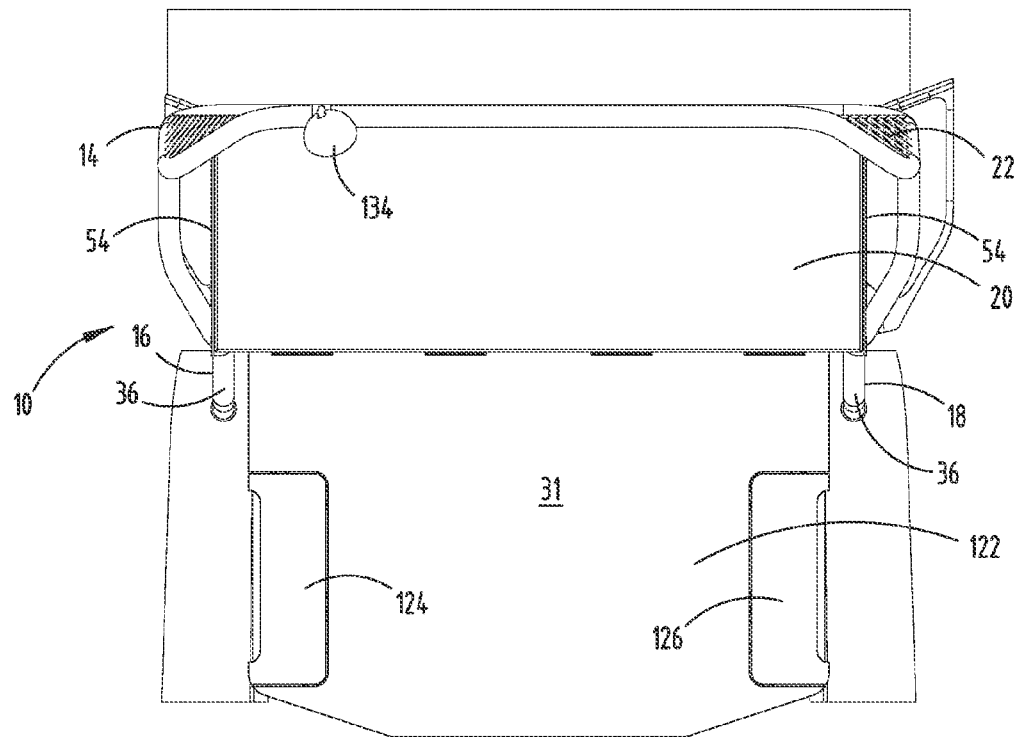
FIG. 7 is a top plan view of the cargo management assembly of FIG. 1B.
Figure 8:
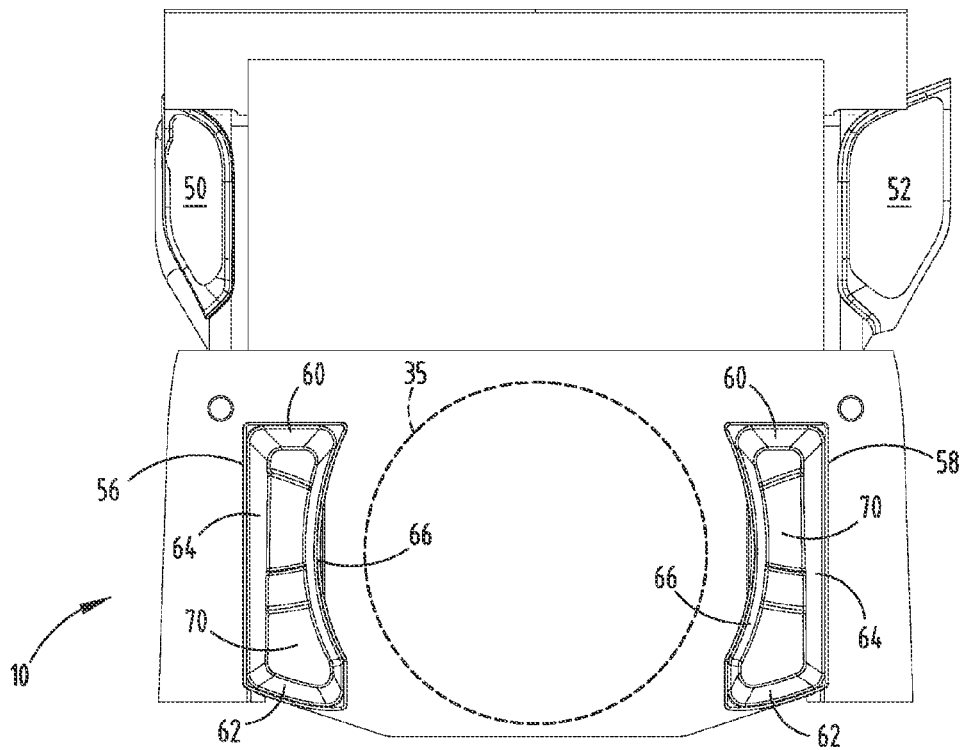
FIG. 8 is a bottom plan view of the cargo management assembly of FIG. 1B.

Referring to FIGS. 1A and 1B, the reference numeral 10 generally designates a cargo management assembly for a vehicle 12 having a support structure 14 with first and second side supports 16, 18. A cabinet assembly 20 is operably connected to the support structure 14. A barrier partition 22 is operably connected to the support structure 14 and a utility wall 24 is disposed below the barrier partition 22 and behind a rear seating assembly 26 of the vehicle 12. A vehicle interior panel 28 is positioned adjacent the first and second side supports 16, 18 and shaped to conform to at least a portion of the support structure 14.

It will be understood by one having ordinary skill in the art that various components of this invention are subject to various constructions. For example, the cabinets, support structure, barrier partition, and interior paneling may have different configurations, as outlined below. The constructions, as discussed, are not meant to be limiting, but exemplary of the various constructions that the cargo management assembly for a vehicle can have. It will be understood by one having ordinary skill in the art that features of the various embodiments may be used across various embodiments, and that the devices shown in each of the various embodiments are not limited to that embodiment alone.

Referring again to the embodiment illustrated in FIGS. 1A and 1B, a support structure 14 is disposed in a cargo area 31 of the vehicle 12 over a spare tire well 33 and includes the first and second side supports 16, 18. The spare tire well 33 includes a spare tire 35. The first and second side supports 16, 18 each include a vertically extending member 36 and an arcuate member 38 attached thereto at a top portion thereof. A horizontal brace 40 extends rearward and connects with the barrier partition 22 to provide stability and additional strength to the support structure 14. The support structure 14 may be comprised of any of a variety of materials, including strong polymers and/or steel. The support structure 14 is integrally connected with the barrier partition 22 at a forward portion thereof. The barrier partition 22 includes a solid frame 44 with an interior fenced portion 46. The barrier partition 22 is designed to prevent occupants, typically detainees, in the rear seat of the vehicle 12 from reaching into the trunk or cargo area 31 of the vehicle 12. As with the support structure 14, the barrier partition 22 may be constructed of a variety of materials including polymers and/or metals. In the illustrated embodiment, both the frame 44 and the fenced portion 46 are comprised of a steel material. The first and second supports 16, 18 are oriented on sides of the cargo area 31 of the vehicle 12 and allow for access to the spare tire well 33, so that the spare tire 35 can be obtained in the event the spare tire 35 needs to be utilized. Thus, the support structure 14 does not impede access to the spare tire well 33.

Referring now to FIGS. 3-6, first and second side storage members 50, 52 are disposed proximate a top portion 54 of the first and second side supports 16, 18. The first and second side storage members 50, 52 are designed to hold small articles typically used during law enforcement activities. These articles may include, but are not limited to, keys, firearms, or confiscated items. Similarly, proximate the bottom of the first and second side supports 50, 52 are first and second lower storage members 56, 58 adapted for storing articles typically used during law enforcement activities. The first and second lower storage members 56, 58 include a forward wall 60, a rearward wall 62, an outside wall 64, and an inside wall 66. The first and second lower storage members 56, 58 also include a base wall 70. The inside wall 66 of the first and second lower storage members 56, 58 are concave so as to provide sufficient space for a spare tire well 33 (FIG. 1B), which holds a spare tire 35, which is disposed between the first and second lower storage members 56, 58. The first and second lower storage members 56, 58 are also designed to be removed from the support structure 14, for example, to assist in removal of the spare tire 35 disposed between the first and second lower storage members 56, 58.

Storage spaces are disposed adjacent to each side of the small cabinets 108, 110, and perforated panels 11 are disposed adjacent the small cabinets 108, 110 proximate the storage spaces.

As shown in FIG. 1A, the support structure 14 is designed for connection with interior vehicle panels 80. It will be understood by one having ordinary skill in the art that the interior vehicle panels 80 are positioned adjacent to the first and second side supports 16, 18, and are shaped to conform to the first and second side supports 16, 18. Additionally, the first and second side storage members 50, 52 and first and second lower storage members 56, 58 are also designed to conform and fit tightly against the interior vehicle panels 80 to provide a smooth seamless and aesthetic presentation of the cargo management assembly 10 inside of the vehicle 12. For example, the arcuate member 38 of the second side support 18 is shown in FIG. 1A fitted with and abutting against a rear interior vehicle panel 80. Additionally, the support structure 14 may include a horizontal support member that is secured to the support structure 14, and is designed to support a shelf or cabinet in position in the cargo area 31 of the vehicle 12. A slide assembly may be positioned on the horizontal support members to assist in guiding a table, whiteboard, etc. between extended and retracted positions.

Referring now to FIGS. 1A-5, the illustrated embodiment includes a utility wall 24 that is positioned behind the rear seating assembly 26 of the vehicle 12. The utility wall 24 is designed to suspend and securely hold electronics 99 on a forward or rearward side thereof forming an integrated electronics space 100, allowing accessibility to the electronics by a user. The integrated utility space 100 is accessible from both sides of the utility wall 24 and provides a secure, concealed, packaging solution with natural convection heat transfer. An additional forced air convection fan 101 may be installed for electronics with higher thermal radiation. The first and second lower storage areas 56, 58 are disposed on either side of the center cabinet assembly 20, and are designed to store additional electronics that may be used in conjunction with any electronics supported on the utility wall 24. The center cabinet assembly 20 includes first and second small cabinets 108, 110 disposed below a larger wide cabinet 112. The first and second small cabinets 108, 110, as well as the larger wide cabinet 112, are movable between an open position and a closed position. The first and second small cabinets 108, 110, as well as the larger wide cabinet 112, can be used to store any of a variety of materials used during law enforcement activities, including, but not limited to, firearms, illuminating devices, such as flashlights, flares, or any of a variety of other devices.

Referring again to FIGS. 1A-3, the spare tire well 33 includes a spare tire access panel 122 that allows access to the spare tire 35 disposed in the spare tire well 33. It will be noted that the spare tire access panel 122 is disposed between access doors 124, 126 that are positioned above each of the first and second lower storage members and allow access thereto. Traditional cargo management systems do not readily provide access to the spare tire 35 without first removing the entire cargo management system. The doors 124, 126 are proximate the first and second lower storage members 56, 58 and are hingedly connected to a spare tire access panel 122 via a piano hinge or living hinge. Alternatively, the doors 124, 126 may be completely removable. The spare tire access panel 122 also is capable of supporting very heavy loads as high as 800 pounds.

Referring now to FIGS. 4-8, it is also contemplated that the illustrated cargo management assembly 10 may include a center cabinet assembly 20 having thumb tabs that are spring-loaded, as well as a central security lock designed to keep dangerous devices, such as firearms, in a locked condition until needed. Additionally, a flood light 134 may be connected to the support structure to provide additional lighting inside the vehicle 12. The flood light 134 is helpful when a group is gathering at the rear of the vehicle 12 to discuss strategies or plans associated with law enforcement activities. A fire extinguisher mount may also be present on the cargo management assembly 10 to hold a fire extinguisher in the cargo area 31 of the vehicle. Additionally, the cargo management assembly 10 includes the first and second lower storage members 56, 58 disclosed above in relation to the embodiment of FIGS. 4 and 6.

It is also contemplated that large lower storage members may be disposed below the barrier partition 22. The large storage members can be used to store any of a variety of useful law enforcement devices. Also, the top cabinet component 112 may be positioned on a sliding rail 148 that is designed to allow ease of access to the top cabinet component 112. The sliding rails 148 allow linear movement of the center cabinet assembly 20 forward and rearward between access positions and storage positions.

Figure 9:
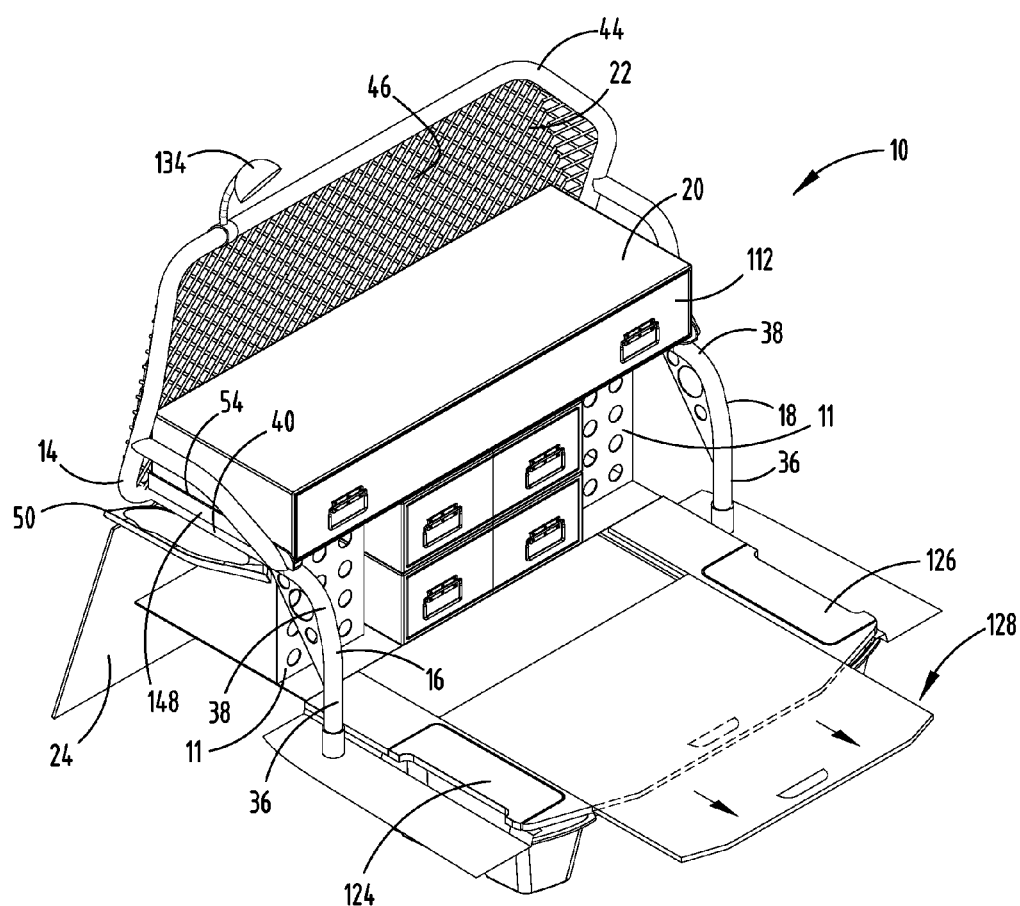
FIG. 9 is a rear perspective view of the cargo management assembly of FIG. 1B with a slidable planning table in an extended position.

Referring now to FIG. 9, in yet another embodiment of the present invention, a slidable planning table 128 is provided that is slidably connected with the first and second side supports 16, 18 and operable between a stored position and an extended position.

In yet another embodiment of the present invention, the cargo management assembly 10 includes a support structure 14 having an E-shaped cross-section in the cargo area 31 of the vehicle 12, and is designed to connect with a plurality of upwardly extending connection posts. The cargo management assembly 10 includes a plurality of shelf supports. The connection posts include linear slots that allow the cargo management assembly 10 to be set at various heights inside the cargo area 31 of the vehicle 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A modular cargo management assembly comprising:
   a support structure having a structural wall and angled side supports;
   a cabinet having a narrowed section and moveably connected with the support structure between extended and retracted positions;
   perforated panels adjacent the narrowed section;
   a barrier partition above the structural wall; and
   a spare tire access panel on a floor member below the support structure, between the angled side supports, operable with the cabinet the retracted position.

2. The modular cargo management assembly of claim 1, wherein the barrier partition includes a rigid outer frame with a rigid interior fenced portion disposed inside the rigid outer frame.

3. The modular cargo management assembly of claim 1, wherein the structural utility wall defines an integrated utility space for at least one electronic device.

4. The modular cargo management assembly of claim 1, further comprising:
   at least one lower storage member disposed adjacent to a side of a spare tire compartment and below the spare tire access panel of the floor member.

5. The modular cargo management assembly of claim 1, further comprising:
   at least one side storage member suspended on at least one of the angled side supports above the spare tire access panel of the floor member.

6. The modular cargo management assembly of claim 1, further comprising:
   a slidable planning table operably connected with the support structure and operable between a stored position and an extended position.

7. The modular cargo management assembly of claim 1, further comprising:
   a sliding rail that supports the cabinet and is adapted to move the cabinet in a cargo area of a vehicle, thereby providing a user additional access to the cabinet.

8. A vehicular cargo management assembly comprising:
   a support structure having a structural utility wall and first and second angled side supports extending horizontally away from structural utility wall and downward adjacent to a spare tire access panel;
   top and bottom cabinet assemblies operably connected with the support structure, wherein the top and bottom cabinet assemblies slide between a stowed position and an extended position, and wherein the bottom cabinet assembly is narrower than the top cabinet assembly to define storage spaces disposed adjacent to each side of the bottom cabinet assembly;
   perforated panels disposed adjacent the bottom cabinet assemble proximate the storage spaces;
   a rigid barrier partition disposed on the support structure above the utility wall; and
   a floor member disposed below the top and bottom cabinet assemblies and the rigid barrier partition, wherein the floor member includes the spare tire access panel that is operable when the top and bottom cabinet assemblies are in the stowed position.

9. The vehicular cargo management assembly of claim 8, wherein the rigid barrier partition includes a rigid outer frame with a rigid interior fenced portion disposed inside the rigid outer frame.

10. The vehicular cargo management assembly of claim 8, wherein the structural utility wall defines an integrated utility space for at least one electronic device.

11. The vehicular cargo management assembly of claim 8, further comprising:
    at least one lower storage member disposed adjacent to a side of a spare tire compartment and below the spare tire access panel of the floor member.

12. The vehicular cargo management assembly of claim 8, further comprising:
    at least one side storage member suspended on at least one of the first and second angled side supports above the spare tire access panel.

13. The vehicular cargo management assembly of claim 8, further comprising:
    a slidable planning table operably connected with the support structure and operable between a stored position and an extended position.

14. The vehicular cargo management assembly of claim 8, further comprising:
    a sliding rail that supports the top and bottom cabinet assemblies and is adapted to move the top and bottom cabinet assemblies in a cargo area of a vehicle, thereby providing a user additional access to the top and bottom cabinet assemblies.

15. A vehicular rear compartment cargo management assembly comprising:
    a support structure including a structural utility wall and angled side supports;
    a cabinet having a narrowed section supporting a widened section, the cabinet beings operably connected to the support structure and moveable between rearward and forward positions;
    perforated panels disposed adjacent the narrowed section;
    a rigid barrier partition connected to the support structure; and
    a spare tire access panel disposed between the angled side supports and operable when the cabinet is in the rearward position.

16. The vehicular rear compartment cargo management assembly of claim 15, wherein the rigid barrier partition includes a rigid outer frame with a rigid interior fenced portion disposed inside the rigid outer frame.

17. The vehicular rear compartment cargo management assembly of claim 15, wherein the structural utility wall defines an integrated utility space for at least one electronic device.

18. The vehicular rear compartment cargo management assembly of claim 15, further comprising:
    at least one side storage member suspended on at least one of the angled supports above the spare tire access panel.

19. The vehicular rear compartment cargo management assembly of claim 15, further comprising:

a slidable planning table operably connected with the support structure and operable between a stored position and an extended position.

20. The vehicular rear compartment cargo management assembly of claim 15, further comprising:

a sliding rail that supports the cabinet and is adapted to move the cabinet in a cargo area of a vehicle, thereby providing a user additional access to the cabinet.

* * * * *